(12) United States Patent
Judd et al.

(10) Patent No.: US 7,043,270 B2
(45) Date of Patent: May 9, 2006

(54) SHARED TOWER SYSTEM FOR ACCOMODATING MULTIPLE SERVICE PROVIDERS

(75) Inventors: Mano D. Judd, Rockwall, TX (US);
Gregory A. Maca, Rockwall, TX (US);
Joel C. Roper, Plano, TX (US)

(73) Assignee: Andrew Corporation, Westchester, IL (US)

( * ) Notice: Subject to any disclaimer, the term of this patent is extended or adjusted under 35 U.S.C. 154(b) by 589 days.

(21) Appl. No.: 09/928,865

(22) Filed: Aug. 13, 2001

(65) Prior Publication Data

US 2003/0032424 A1    Feb. 13, 2003

(51) Int. Cl.
*H04B 1/38* (2006.01)
*H04M 1/00* (2006.01)

(52) U.S. Cl. ............ 455/561; 455/562.1; 455/73; 455/82; 455/88; 370/310.2; 370/322; 370/329; 370/334

(58) Field of Classification Search ............ 455/73, 455/82, 88, 102, 561, 562.1; 370/310.2, 370/314, 320, 321, 322, 329, 334
See application file for complete search history.

(56) References Cited

U.S. PATENT DOCUMENTS

| | | | | |
|---|---|---|---|---|
| 4,845,504 A | * | 7/1989 | Roberts et al. | 342/457 |
| 5,023,866 A | * | 6/1991 | De Muro | 370/278 |
| 5,590,415 A | * | 12/1996 | Peltola et al. | 455/115.1 |
| 5,646,942 A | | 7/1997 | Oliver et al. | 370/112 |
| 5,666,365 A | | 9/1997 | Kostreski | 370/486 |
| 5,680,142 A | | 10/1997 | Smith et al. | 342/372 |
| 5,689,245 A | | 11/1997 | Noreen et al. | 340/825.49 |
| 5,745,841 A | | 4/1998 | Reudink et al. | 455/62 |
| 5,781,865 A | | 7/1998 | Gammon | 455/561 |
| 5,854,611 A | | 12/1998 | Gans et al. | 342/373 |
| 5,854,986 A | * | 12/1998 | Dorren et al. | 455/562.1 |
| 5,872,547 A | | 2/1999 | Martek | 343/815 |
| 5,880,701 A | | 3/1999 | Bhame et al. | 343/890 |
| 5,884,147 A | | 3/1999 | Reudink et al. | 455/62 |
| 5,889,494 A | * | 3/1999 | Reudink et al. | 342/373 |
| 5,929,823 A | | 7/1999 | Martek et al. | 343/817 |
| 5,937,019 A | | 8/1999 | Padovani | 375/358 |
| 5,946,622 A | | 8/1999 | Bojeryd | 455/444 |
| 5,969,689 A | | 10/1999 | Martek et al. | 343/758 |
| 5,991,628 A | | 11/1999 | Pedziwiatr et al. | 455/443 |
| 6,055,230 A | * | 4/2000 | Feuerstein et al. | 370/335 |
| 6,070,090 A | | 5/2000 | Feuerstein | 455/561 |
| 6,150,984 A | | 11/2000 | Suguro et al. | 343/702 |

(Continued)

FOREIGN PATENT DOCUMENTS

EP    0 639 035    2/1995

(Continued)

OTHER PUBLICATIONS

Great Britain, *Patents Act 1977: Search Repot Under Section 17*, Date of Search Jan. 23, 2004 (1 page).

*Primary Examiner*—Stephen D'Agosta
(74) *Attorney, Agent, or Firm*—Wood, Herron & Evans, LLP

(57) ABSTRACT

A system for sharing a cellular tower among multiple service providers comprises an antenna having an array of elements operable to define multiple, individual beams for signals in a communication frequency band and converter circuitry to convert the communication frequency band to a digital band. Filtering and signal processing circuitry define digital band portions for each of the at least two service providers, and drive the antenna to define at least one individual beam for each individual service provider.

24 Claims, 5 Drawing Sheets

U.S. PATENT DOCUMENTS

| | | | |
|---|---|---|---|
| 6,157,847 A | 12/2000 | Buehrer et al. | 455/561 |
| 6,173,189 B1 | 1/2001 | Lockhart | 455/561 |
| 6,181,276 B1 | 1/2001 | Schlekewey et al. | 342/372 |
| 6,181,955 B1 | 1/2001 | Dartois | 455/562 |
| 6,188,373 B1 | 2/2001 | Martek | 343/893 |
| 6,188,912 B1 * | 2/2001 | Struhsaker et al. | 455/561 |
| 6,195,556 B1 | 2/2001 | Reudink et al. | 455/456 |
| 6,198,434 B1 | 3/2001 | Martek et al. | 342/373 |
| 6,198,435 B1 | 3/2001 | Reudink et al. | 342/373 |
| 6,233,466 B1 | 5/2001 | Wong et al. | 455/562 |
| 6,236,849 B1 | 5/2001 | Reudink et al. | 455/342 |
| 6,236,866 B1 | 5/2001 | Meyer et al. | 455/115 |
| 6,246,674 B1 | 6/2001 | Feuerstein et al. | 370/334 |
| 6,252,867 B1 | 6/2001 | Pfeil et al. | 370/335 |
| 6,289,221 B1 * | 9/2001 | Ritter | 455/447 |
| 6,295,026 B1 | 9/2001 | Chen et al. | 342/368 |
| 6,297,711 B1 | 10/2001 | Seward et al. | 333/129 |
| 6,317,100 B1 | 11/2001 | Elson et al. | 343/853 |
| 6,323,823 B1 | 11/2001 | Wong et al. | 343/844 |
| 6,324,405 B1 | 11/2001 | Young et al. | 455/456 |
| 6,336,033 B1 | 1/2002 | Yamaguchi et al. | 455/273 |
| 6,351,654 B1 | 2/2002 | Huang et al. | 455/562 |
| 6,360,094 B1 | 3/2002 | Satarasinghe | 455/423 |
| 6,366,789 B1 | 4/2002 | Hildebrand | 455/561 |
| 6,377,819 B1 | 4/2002 | Gesbert et al. | 455/562 |
| 6,658,263 B1 * | 12/2003 | Ke et al. | 455/524 |
| 2001/0012788 A1 | 8/2001 | Gammon | |
| 2002/0008577 A1 | 1/2002 | Cova et al. | |

FOREIGN PATENT DOCUMENTS

| | | |
|---|---|---|
| EP | 0 878 974 | 11/1998 |
| EP | 1 111 821 | 6/2001 |
| GB | 2 320 618 A | 6/1998 |
| JP | 9-98018 | 8/1997 |
| WO | WO 97/44914 | 11/1997 |
| WO | WO 98/39851 | 11/1998 |
| WO | WO 00/03479 | 1/2000 |
| WO | WO 01/06801 | 1/2001 |
| WO | WO 02/19470 A1 | 3/2002 |
| WO | WO 02/039541 A3 | 5/2002 |

* cited by examiner

SHARED TOWER SYSTEM FOR ACCOMODATING MULTIPLE SERVICE PROVIDERS

FIELD OF THE INVENTION

This invention relates generally to the provision of cellular services and specifically to the accommodation of multiple service providers from a single cellular tower.

BACKGROUND OF THE INVENTION

In the provision of wireless communication services within a cellular network, individual geographic areas or "cells" are serviced by one or more base stations. A base station has at least one cellular tower associated therewith, utilizing RF antennas which communicate with a plurality of remote devices, such as cellular phones and paging devices. The tower is then linked with other facilities of the service provider, including a switching office, for handling and processing the wireless communication traffic. The tower might be coupled to the switching office through land lines, or alternatively, the signals might be transmitted or backhauled through microwave backhaul antennas. Another tower might also be involved for delivering the wireless traffic to the switching office or another site. Generally, a tower will have various RF antennas and microwave backhaul antennas associated with each of the different wireless service providers, such as AT&T, Sprint, Verizon, and others having coverage for the area where the tower is located. As may be appreciated, each cellular tower generally accommodates a plurality of RF and/or microwave backhaul antennas.

Traditionally, cellular base stations and towers were owned and operated by the service providers. However, today, such towers are owned by third-party companies who are driven to operate the towers as efficiently and profitably as possible. To that end, and to maximize profits, cellular towers often accommodate multiple service providers desiring coverage in a geographic area. However, there are physical capacity limits for cellular towers which limit the capacity of the towers in handling all of the equipment for all possible service providers. Specifically, a greater number of service providers for a cell or cell sector has translated into additional equipment being loaded onto the tower. However, the physical tower loading must remain within desired parameters for the integrity of the tower.

For example, on a typical cellular tower, multiple providers (Q) each might have sets of 6–9 RF link antennas on a single tower. Such antennas, in addition to their own weight, each require Q×(6–9) cables. In addition to the RF link antennas, there will often be multiple microwave backhaul antennas (P), directed at various orientations around a 360° axis, adding not only additional antenna weight, but also requiring P additional cables or waveguides hanging from the tower. Adding additional service providers and the hardware associated therewith, will therefore, tax the tower to its physical capacity. Furthermore, weight is not the only concern, as the antennas and cables increase wind resistance for towers that must withstand 60 mile/hour winds. Still further, ice on the various antenna hardware and cables will further increase physical strain on a tower. Therefore, the physical capacity of the tower currently limits the ability to serve every interested service provider, and therefore limits the revenue of the tower owners in selling their tower space to service providers.

Simply building more towers is not a desirable solution. In addition to the cost to build and maintain the tower, communities are starting to vigorously protest the location of such towers due to their unsightly addition to the landscape. This is particularly so in densely populated areas where more towers might be needed or coverage is particularly desired by the service provider.

Another revenue limiting issue for tower owners is that there is only one tower top. The most desirable position for a service provider is to be operating from RF link or microwave backhaul antennas positioned at or very close to the top of the tower. The highest amount of revenue, or tower rent fees, for a tower operator is generated by those service providers using equipment at the top of the tower. Those service providers with equipment located below the tower top, understandably, will only pay lesser fees.

Another particular concern for service providers is the shape and direction of their signal beams. Different providers have different demands, thus putting a further burden on tower owners. While tower owners may provide specific beams to a service provider, such an option is often expensive, and will usually require additional equipment on the tower for that specific service provider. Furthermore, offering the service to one tower customer creates a desire by other tower customers, requiring even more equipment and expense to maintain the customers.

Consequently, tower operators have various factors to consider as they sell their tower services to wireless service providers. Traditionally, the tower operators have worked to sell their tower space and to put as much equipment on a tower as they could physically accommodate. The tower owners would like to have every possible service provider on their towers. Of course, every service provider will want the tower top location and will want special considerations, such as specific beam shapes or directions. As such, there exists a tension in the tower market due to limitations in the current technology which limits not only the revenues of the tower owner but also the benefits to be received by a service provider.

Therefore, it is desirable for a tower operator to increase revenues by accommodating every potential service provider customer on the tower.

It is further desirable, both from a revenue standpoint for the tower owner and a performance standpoint for the service provider, to have all service providers located at the tower top.

In addition to accommodating all of the service providers, the tower owner also wants to be able to meet the specific performance criteria of each of their potential service provider customers, including beam considerations, in order to entice them to purchase the services of the tower owner.

BRIEF DESCRIPTION OF DRAWINGS

The accompanying drawings, which are incorporated in and constitute a part of this specification, illustrate embodiments of the invention and, together with the detailed description of the embodiments given below, serve to explain the principles of the invention.

DETAILED DESCRIPTION OF EMBODIMENTS OF THE INVENTION

The invention addresses the above-noted desires and needs in the art and provides a system for accommodating multiple service providers on a single tower. While the invention described herein is described in connection with various preferred embodiments, it is understood that the invention is not limited to those particular embodiments. Rather, the description of the invention is intended to cover various alternatives, modifications, and equivalent arrangements as may be included within the scope of the invention as defined by the application.

The present invention relates to the concept of sharing a cellular tower among multiple service providers, while providing those service providers with tower top locations for their equipment, as well as tailored beams for their signals. Such a concept is applicable to the RF link systems on a tower, as well as the microwave backhaul systems on the same tower. The system allows for maximizing revenue for a tower owner while providing desirable performance characteristics for a wireless service provider.

Figures 1, 2:
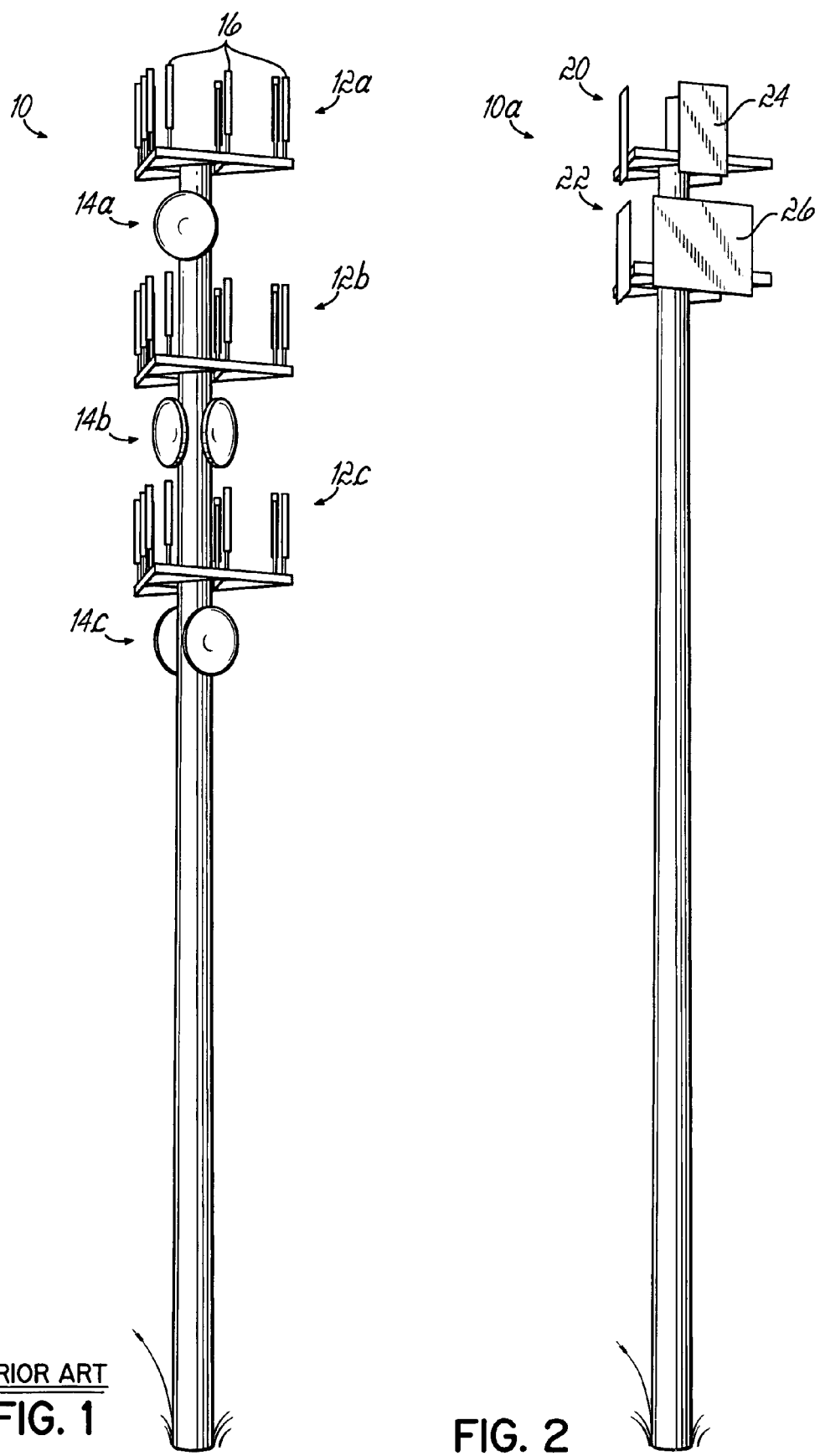
FIG. 1 is a perspective view of the traditional cellular tower.
FIG. 2 is a perspective view of a cellular tower incorporating an embodiment of the present invention.

FIG. 1 shows a schematic view of a typical base station cellular tower 10 having RF link and microwave backhaul equipment of multiple service providers thereon for facilitating wireless communication, according to aspects of the present wireless technology. Tower 10 will generally be owned by a tower operator who desires to sell or rent use of the tower to wireless service providers, such as AT&T, Sprint, and Verizon, to name just a few possible service providers.

Tower 10 includes one or more sets of RF link antennas, 12a, 12b, and 12c (corresponding to the multiple service providers on the tower) for providing the wireless communication link between the base station of tower 10 and a plurality of remote devices, such as cellular phones, pagers, and other wireless devices. Also associated with the tower are one or more backhaul antennas, or sets of antennas, indicated by reference numerals 14a, 14b, and 14c, which provide microwave backhaul of the communication signals, such as to a switching office for a service provider, or to another tower. The tower will usually include one or more land lines (not shown) such as for communication with the switching office or a remote location. Also associated with tower 10, but not shown in the drawings, are base station electronics, usually located at the base of the tower, which encompass any of the electronics not included at the antennas or up on the tower for processing wireless communications. Cables running from the various RF link antennas 12a–12c and microwave backhaul antennas 14a–14c run down to the electronics at the base of the tower and, as noted above, add to the weight and complexity of the tower equipment. Any additional equipment added to tower 10 diminishes the future capacity of the tower.

An RF link system 12a will include sets of RF antennas 16 with each set facing a portion or sector of a cell associated with tower 10. In FIG. 1, a tower defining three sectors is illustrated, although other numbers of sectors might also be defined by the tower. Generally, FIG. 1 shows three RF antenna structures 16 facing each of three defined sectors. Furthermore, based upon the orientation of the RF link system 12a–12c on the tower, each RF link system is generally shown to be oriented to service a similar sector. Alternatively, the various systems 12a–12c might be oriented at different angles around a 360° axis of the tower 10 so that different sectors are defined by each RF link system 12a–12c.

The microwave backhaul antennas 14a–14c are illustrated as being directed in various different directions. In that way, the microwave backhaul signals are sent to multiple points from the single tower point to backhaul signals to those multiple points, such as multiple switching offices, or to other towers. Tower 10 and the associated RF link and microwave backhaul will generally operate within allocated frequency bands which are recognized or authorized by governmental bodies such as the Federal Communications Commission (FCC), or any similar foreign counterparts, such as the European Telecommunications Standardization Institute (ETSI) in Europe, which are intended for use for wireless and microwave communications. Similarly, the present invention is directed for operation in various conventional wireless and microwave bands used for RF links and microwave backhaul.

FIG. 2 illustrates a cell tower incorporating various embodiments of the present invention. The shared tower system of the invention provides an array 20 of RF link sector antennas 24, to be shared by multiple service providers. As illustrated in the Figure, the array of sector antennas 20 is positioned on the tower top, and thus all potential service providers are given tower top access, in accordance with one aspect of the present invention. This location, of course, increases the revenues paid by each service provider to the tower owner.

Each individual RF sector antenna 24 provides multiple and simultaneous individual signal beams in the sector for each individual service provider using the array. That is, the beams provided for each service provider are specifically tailored according to the direction and performance criteria set forth by that service provider in accordance with another invention aspect. Additionally, and in accordance with still another aspect of the present invention, digital beam steering is provided so that each service provider has flexibility with respect to their multiple beams for all sectors serviced by the tower 10a. By providing multiple, individually-steered beams for each service provider, the carrier to interference (C/I) performance criteria for the service provider is improved. The present invention offers such performance improvement for each individual service provider.

Similarly, the array 22 of microwave backhaul sector antennas 26 provides multiple, simultaneous beams in each sector in different directions which provide the desired point-to-multipoint characteristics which are necessary for the microwave backhaul signals to reach the various locations remote from the tower (e.g., switching offices, other cell towers, etc.). Digital beam steering is also provided for the microwave backhaul beams of each service provider and each sector antenna 26 to provide flexibility in the microwave backhaul operation. The present invention not only allows a greater number of providers access to a particular tower without physically overloading the tower, but as mentioned above, it also provides every service provider the top location on the tower. This is extremely desirable for both the tower operator and service provider. Furthermore, the sharing of the array of sector antennas for both the RF links and the microwave backhaul reduces the operation costs for the operator, because such costs are spread out over a greater number of service providers. Furthermore, the present invention allows the use of lower capacity tower structures by reducing the large amount of hardware required to accommodate each of the numerous service providers using the tower.

Figure 3:
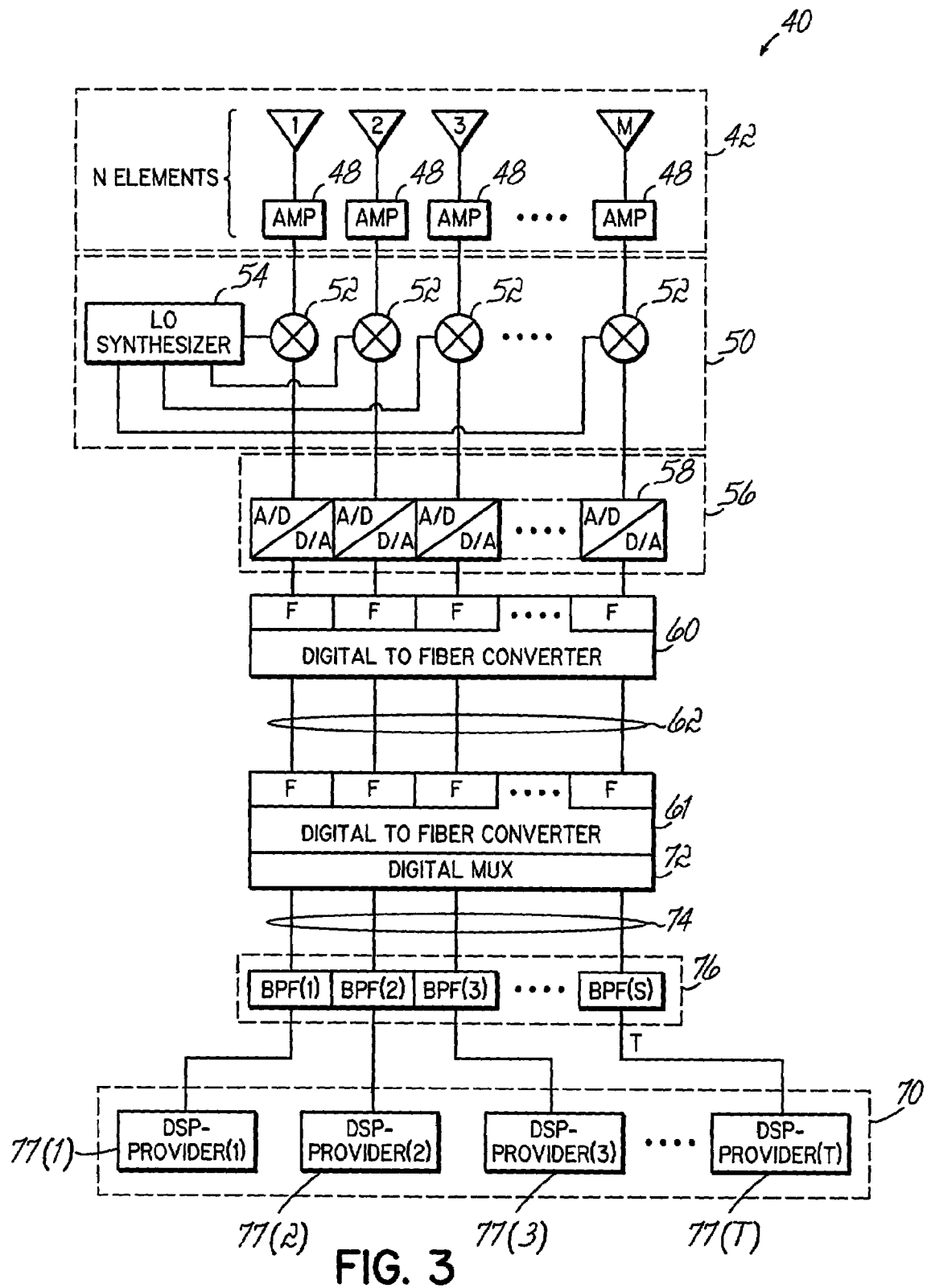
FIG. 3 is a circuit block diagram of one embodiment of the present invention.

FIG. 3 illustrates a basic circuit schematic diagram of one embodiment of the tower sharing invention allowing multiple service providers to share the top location of a cellular tower. The embodiments, as illustrated herein, in accordance with the various aspects of the invention, may be utilized for the multiple sectors and sector antennas 24 associated with the RF link array 20 and/or with the multiple sectors and sector antennas 26 associated with microwave backhaul array hardware 22 (FIG. 2). To that end, in one embodiment of the invention, only the RF link hardware might incorporate the invention whereas the microwave backhaul is handled conventionally. Similarly, in another embodiment, microwave backhaul hardware may incorporate the present invention, whereas the RF link is handled conventionally. Alternatively, both the RF link and microwave backhaul might be handled in accordance with the aspects of the invention. Accordingly, the invention gives flexibility with respect to tower design and management to maximize service providers on a tower and thereby maximize revenues for the tower operator.

System 40, as shown in FIG. 3, utilizes an antenna 42 having an array of elements which are operable to define multiple, individual beams for signals in one or more communication frequency bands. As noted above, the invention is directed to conventional wireless or microwave bands which are currently defined and utilized, but also will be suitable for other bands which may be formally recognized and designated in the future. The antenna 42 might resemble antenna 42*a*, shown in FIG. 3A. Antenna 42*a* comprises an array of elements 44 which are arranged generally in a pattern including a plurality of M columns (designated 1–M) with N elements per column (designated 1–N). The M by N array of elements 44 may be formed by suitable techniques, such as by providing strip line elements or patch elements on a suitable substrate and ground plane, for example.

Utilizing an array of elements, a beam, or preferably a number of beams, may be formed having a desired shape and direction. Beamforming with an array antenna is a known technique. In accordance with the principles of the present invention, the beam or beams formed by antenna 42 are digitally adapted for a desired shape, elevation and azimuth, as desired by each individual service provider utilizing the shared tower system of the invention. In accordance with another aspect of the present invention, the antenna 42 is driven to adaptively and selectively steer the beams as necessary for the service provider.

In beamforming, according to the invention, individually manipulating the signals to each array element 44 allows beam steering in both azimuth and elevation. Alternatively, azimuth beam steering may be more desirable than elevation beam steering, and therefore individual signals to columns 1–M are manipulated, that is the individual columns are manipulated to provide a beam which may be steered in azimuth while generally having a fixed elevation. The present invention utilizes the aspects of such digital beam steering for the desired results within the shared tower system.

Figure 3A:
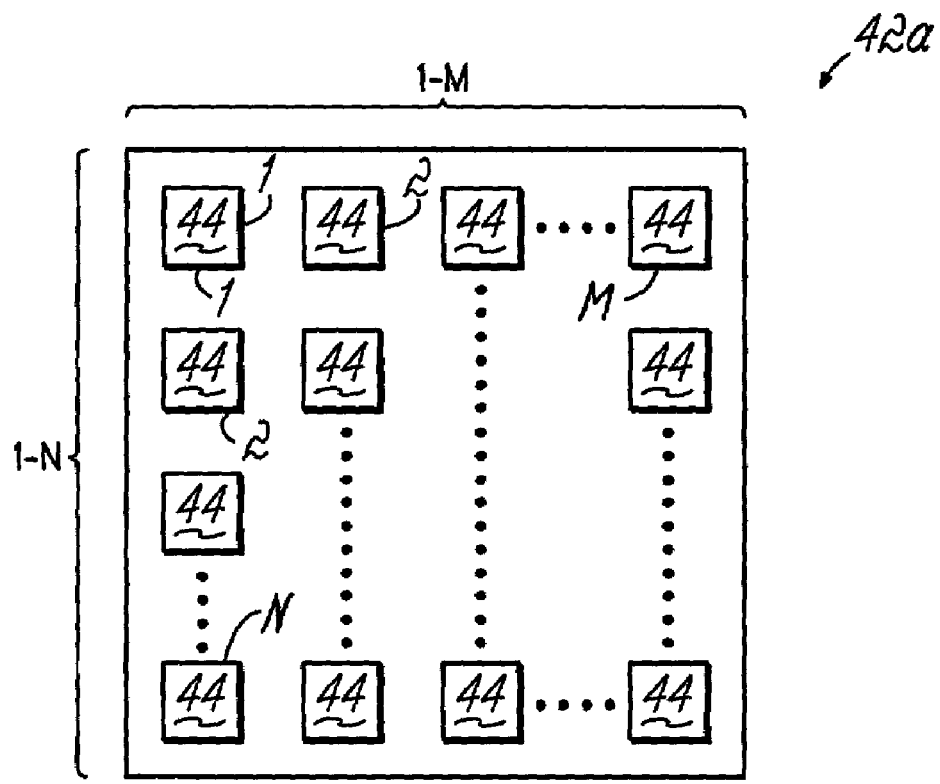
FIG. 3A is a schematic diagram of an antenna structure of one embodiment of the invention.

Referring again to FIG. 3, antenna 42 is shown to also include amplifier circuits 48 associated with each of the array columns 1–M. While such amplifier circuits may be located at the base of a cellular tower, as is conventional, in accordance with one embodiment of the present invention, it is desirable to utilize a distributed active antenna in which the amplifier circuits 48 are incorporated within the antenna structure 42 along with the radiating element 44 (FIG. 3A). The amplifier circuits might be distributed to each element 44 or individual columns 1–M. Exemplary embodiments of such antennas are illustrated in U.S. patent application Ser. No. 09/538,955, filed Mar. 31, 2000 and entitled "Antenna System Architecture" and U.S. patent application Ser. No. 09/299,850, filed Apr. 26, 1999 and entitled "Antenna Structure And Installation" which are commonly assigned with the present application and are incorporated herein by reference in their entirety. Alternatively, the antenna may be a passive antenna without amplifier circuits, as shown and discussed in FIG. 5.

Figure 4:
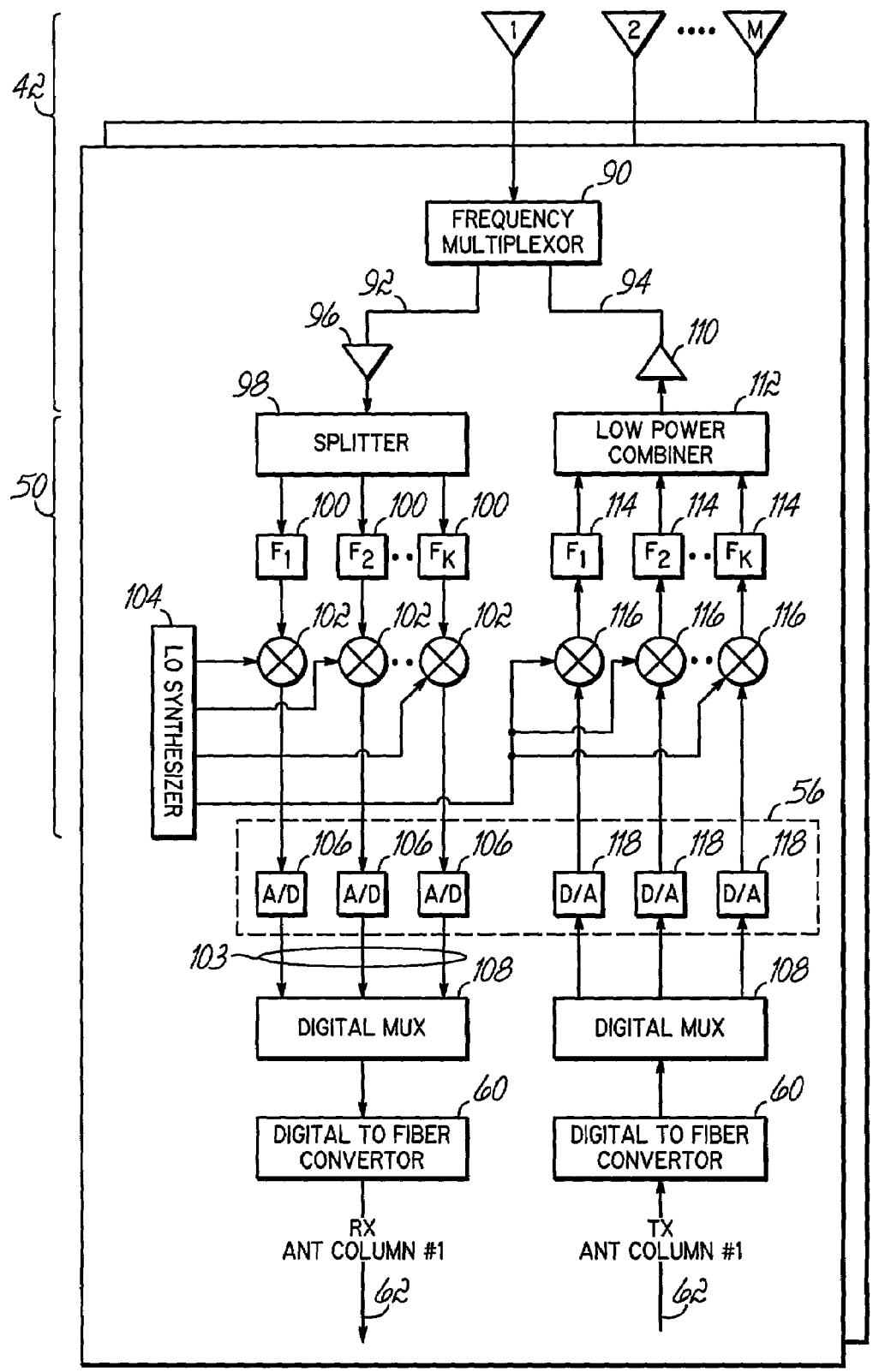
FIG. 4 is a circuit block diagram of an alternative embodiment of the present invention.

The embodiment illustrated in FIG. 3 is simplified, and does not illustrate individual transmit and receive paths associated with each column of the antenna array, or even each radiating element 44. However, as illustrated in FIG. 4 and discussed further herein, each column 1–M, or individual element 44, will generally incorporate a frequency multiplexor circuit 90, such as a diplexer or quadplexer, which allows individual transmit (Tx) and receive (Rx) signals to be directed simultaneously to and from the antenna 42, as is known in the art. Furthermore, as is known in the art, the amplifier circuits 48 incorporated within the transmit side of the system will generally be high power amplifiers, such as multicarrier power amplifiers (MCPA), whereas the amplifiers utilized on the receive side of the system will generally be low noise amplifiers (LNA).

Coupled to the antenna 42 is frequency converter circuitry 50 which has the necessary modulation and demodulation circuitry for upconverting and downconverting the antenna signals of the elements 44. For an RF link, the antenna signals at the antenna will be within a defined RF communication frequency band, such as a PCS 1900, or a cellular 800 band. Those RF signals are associated with up-conversion (Tx) or down conversion (Rx) and one or more intermediate frequencies (IF) through the frequency converter circuitry 50. Similarly, for microwave backhaul, the antenna signals are in microwave frequency band, and are converted between that frequency band and one or more IF frequencies.

Returning to FIG. 3, the frequency converter circuit 50 will generally include a plurality of mixers 52 driven by a local oscillator (LO) signal from an LO synthesizer 54. FIG. 3 basically illustrates one level or stage of frequency conversion by a single stage of mixers 52. As will be understood by a person of ordinary skill in the art, additional stages of mixers and conversion steps may be incurred as necessary for converting the antenna signal to an IF form for further processing. Furthermore, the individual mixers 52 are actually representative of the up-conversion and down-conversion which would occur between the transmit and receive bands as illustrated individually in FIG. 4. In one embodiment, the frequency conversion is handled for the entire communication frequency band, whether RF or microwave.

The signals associated with the antenna 42 are referred to herein as "antenna signals," and they are of a form for transmitting and receiving information through the antenna 42. After or before the antenna signals are frequency converted, the signals are referred to generally as IF signals to distinguish them from the RF or microwave antenna signals. The nomenclature utilized is not to any way to limit the invention, but rather, is used to refer to the signals at different stages of their processing.

The resulting IF signals from the converted frequency band are further converted to digital IF. Digital conversion circuitry 56 converts the signals between IF signals and digital signals within what is referred to herein as a defined digital band corresponding to the entire RF or microwave communication frequency band in one aspect of the invention. The digitized IF signals are often referred to as digital IF. The digital conversion circuitry 56 converts the signals to be further digitally signal processed for interfacing with a service provider, as discussed further hereinbelow. The entire communication frequency band is converted and represented in the converted digital IF band. Illustrated in FIG. 3 are circuit blocks 58 associated with each column 1–M and indicated as A/D for Analog-to-Digital and D/A for Digital-to-Analog. The A/D sections of such blocks are generally attributed to the downlink or receive side of the circuit and designate circuitry to provide an analog-to-digital conversion, whereas the D/A portions of the blocks are generally attributed to the uplink or transmit side of the circuit, and designate circuitry to provide digital-to-analog conversion. Generally, the digital conversion circuitry converts between the entire IF band at the antenna side and a corresponding digital IF band at the processing side. Generally, the digital conversion circuitry 56 converts the signal to a form which may be readily processed by known digital signal processing (DSP) techniques, such as channel digital signal processing, including time division techniques (TDMA) and code division techniques (CDMA). The digital signals, at that point, are in a defined digital band which is associated with the antenna signals and a communication frequency band, such as a PCS 1900 band. The digital IF signals in the defined digital band are coupled with digital signal processing circuitry 70 through converters 60, 61 and fiber optic cables 62. The converters 60, 61 are digital-to-fiber converters, and allow the signals of the digital IF band, to be routed to the digital signal processing circuitry of each T providers.

In accordance with one aspect of the invention, the digital signal processing circuitry 70 for a plurality (T) of service providers, is operable to process and provide the signals associated with the service provider for the purposes of wireless communication. The digital signal processing circuitry 70, for example, will provide the desired modulation and demodulation associated with the service provider. The digital signal processing circuitry 70 is also operable to define an individual beam, or multiple individual beams, simultaneously for each individual service provider, utilizing an antenna array 20, 22. The antenna is thereby digitally driven or executed to define and steer the beams of the service provider. Accordingly, in accordance with one aspect of the present invention, each digital signal provider has its own set of beams, which may be configured to point in various different directions generally unrelated to the beams of another service provider utilizing the same antenna array. As such, the present invention customizes the antenna array 20, 22 for each service provider. This is extremely desirable for both the service provider and the entity owning and operating the tower. A single array is used for all providers, and all providers have the tower top location.

Referring to FIG. 3, in accordance with one embodiment of the invention, the digital IF band is duplicated through a digital multiplexor 72, and the multiple duplicated digital IF bands 74 are coupled to digital signal processing circuitry 70 through filtering circuitry 76, including a plurality of band-pass filters, BPF(1)–BPF(T) where T is the number of providers associated with the antenna array. Corresponding to the number of service providers, the digital signal processing circuitry 70 will include individual signal processing circuitry for providers referred to as 77(1–T). The digital IF band is passed through the plurality of bandpass filters of the filtering circuit 76 to thereby isolate and define individual portions of the digital IF band corresponding to the antenna signals of the individual service providers. For example, 15 MHz of a PCS 1900 band might be defined for AT&T, while another 15 MHz band portion might be defined for Sprint, and so on, for the various service providers. The individual digital signal processing circuitry 77(1–T) for each of the multiple service providers is operable to process channel information associated with that provider's signals, while digitally defining individual beams simultaneously for each individual service provider. Furthermore, the digital signal processing circuitry for each provider is operable to provide digital beam steering as necessary to selectively and desirably steer the beam in azimuth and/or elevation, as desired by the service provider.

Figure 3B:
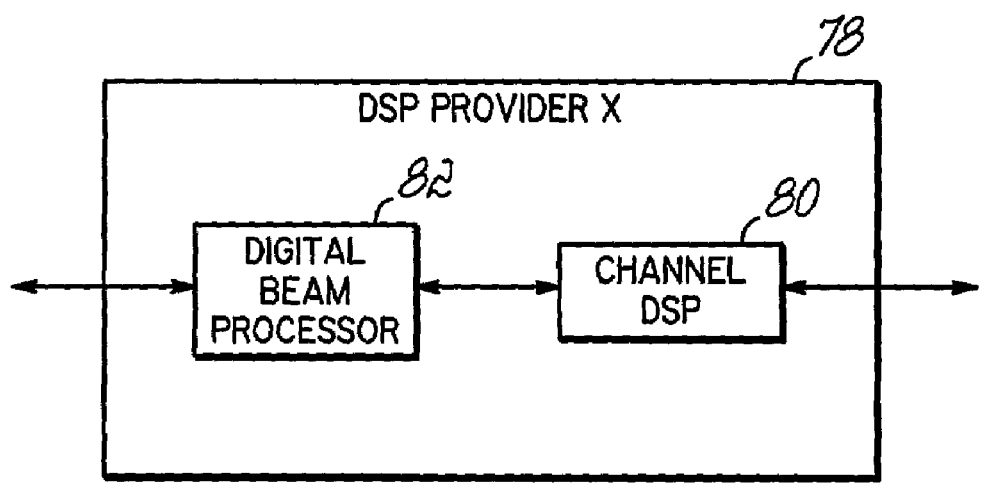
FIG. 3B is a block diagram of signal processing circuitry for an embodiment of the invention.

Referring to FIG. 3B, the digital signal provider circuitry 78 for a service provider X is shown and includes a channel DSP circuit 80, as well as a digital beam processor 82 for digital beam forming and digital beam steering in accordance with certain aspects of the invention. The DSP circuitry 78 for a provider, in combination with the filtering circuitry 76 defining a band portion for that provider, allows each provider a specifically tailored antenna with multiple, simultaneous, and individual beams and digital beam steering of those beams. The various beams for the different providers may be oriented in different directions and have different shapes.

Such features of the invention are certainly desirable in an RF link sector antenna wherein the beams may be selectively directed for an improved C/I ratio. Similarly, for a microwave backhaul application, the invention provides multiple simultaneous beams in different directions for point-to-multipoint operation, thereby eliminating the need for multiple microwave backhaul antenna structures pointing in various different directions around the tower. Still further, in accordance with another aspect of the invention, the invention would be utilized for both the RF link system and/or the microwave backhaul system for a provider.

Referring again to FIG. 3, within a desired distributed active antenna (DAA), the amplification circuitry 48 might be incorporated directly with the array elements in a single antenna structure, at the top of the tower. The frequency converter circuitry 50 and digital converter circuitry 56 might also be incorporated within the active antenna at the top of the tower. The signals are then passed back and forth between the tower top and the base of the tower and wherever the digital signal processing circuitry 70 is located, by fiber optic cable 62.

FIG. 4 illustrates an alternative embodiment of the invention showing individual transmit and receive paths. Specifically, circuitry for such a path is shown for an individual column of N array elements, as shown in FIG. 3. In FIG. 4, M columns define the antenna structure, and the circuit is duplicated for each column. Such a circuit would essentially provide for azimuth beam steering in accordance with the principles of the present invention. In order to provide for elevational beam steering as well, the circuit would be reproduced for each of the M×N elements of the antenna. For the purposes of illustration, the embodiment of the invention will be disclosed with respect to a single column of elements in the antenna.

An antenna signal in a communication frequency band and associated with column 1 passes through a frequency multiplexor 90 which operates at one or more desired communication frequency bands, such as, for example, a PCS 1900 band, or a cellular 800 band. Through the frequency multiplexor 90, the receive signal 92 and transmit signal 94 are separated or joined to be individually processed or transmitted, as is conventional. Turning to the receive signal 92, the signal passes through a suitable amplifier, such as an LNA 96, and is split by a splitter 98 to provide signals for a series of K bandpass filters 100, indicated as $F_1-F_K$. The bandpass filters 100 divide the frequency communication band into a number of smaller bands or band portions for frequency conversion rather than a frequency conversion of the entire frequency band as noted above. Frequency converter circuitry, designated generally as 50, includes a plurality of mixers 102 driven by an LO synthesizer 104 for downconverting portions of the band from microwave or RF frequencies to IF. Controls (not shown) might be used to control the LO synthesizer and the other frequency conversion circuitry. As discussed hereinabove, the antenna utilized might be a distributed active antenna where the array elements, frequency multiplexor, and amplifiers are incorporated into a single antenna, as indicated by bracket 42. Alternatively, the antenna may be a passive antenna wherein the multiplexing, amplification, and frequency conversion circuitry are located elsewhere, such as at the base of the tower, or removed from the antenna as discussed further hereinbelow with respect to FIG. 5.

The receive signal 92, and specifically the multiple band portions 100, are digitally converted through a series of A/D converters 106 (e.g. 41 MSPS, 12–14 bit) after being downconverted in band portions from the RF or microwave frequency communication band. The resulting groups of digital IF signals 103, are multiplexed by a digital multiplexor 108 and converted for digital transmission on fiber optic cable by a digital-to-fiber converter 60 as discussed with respect to FIG. 3. As illustrated in FIG. 4, a receive and transmit signal will be generated for each of the antenna columns 1–M. In the embodiment illustrated in FIG. 4, the entire communication band is divided for readily being downconverted, as the communication frequency band which may be 60 MHz or wider might more easily be converted and digitized in that way rather than handling the entire band. Fiber optic cables 62 then run to appropriate filtering circuitry 76 and digital signal processing circuitry 70 as described above with respect to FIG. 3. The transmit side of the embodiment illustrated in FIG. 4 utilizes a suitable high power amplifier 110, such as a multicarrier power amplifier (MCPA). The upconverted band is supplied to amplifier 110 through a low power combiner 112. The frequency conversion circuitry also utilizes a plurality of bandpass filters 114 indicated as $F_1-F_K$. Mixers 116 are driven by the LO synthesizer 104 for the upconversion of the signal. A digital IF signal provided on fiber cable 62 from a service provider's digital signal processing circuitry is multiplexed through a digital multiplexor 108, and the digital IF signal is then converted through a series of digital to analog (D/A) converters 118 (e.g. 41 MSPS, 12–14 bit) to an IF before being upconverted to RF or microwave to be transmitted by antenna 42.

Figure 5:
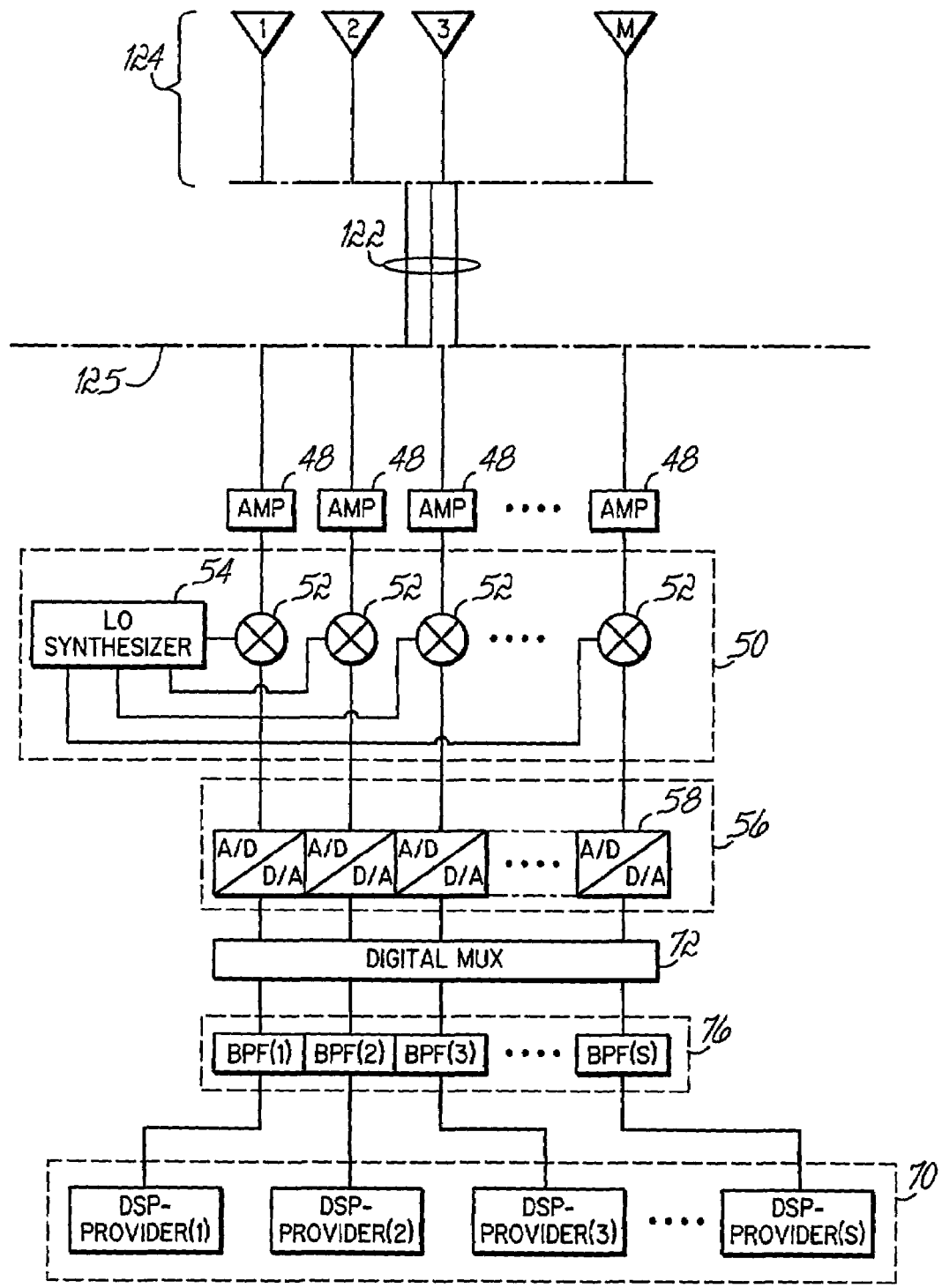
FIG. 5 is a circuit block diagram of an alternative embodiment of the present invention.

FIG. 5 illustrates another alternative embodiment of the invention, similar to the general illustration in FIG. 3, wherein passive antenna elements 124 are utilized at the top of the tower rather than a distributed active antenna. Coaxial cables 122, at least one for each column, are directed down the tower in the conventional fashion, and the amplification circuitry, frequency converter circuitry 56, filtering circuitry 76, and digital signal processing circuitry 70 is at the base of the tower or beyond the base of the tower. In that way, the present invention might be retrofitted into existing cell tower structures utilizing passive antenna elements. The embodiment as described and shown in FIG. 4, might also be incorporated into a passive antenna scenario similar to that illustrated in FIG. 5.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A system for sharing a cellular tower among multiple service providers comprising:
   an antenna having an array of elements arranged in columns of multiple elements and operable to define multiple, individual beams by controlling elements of the columns, for handling signals of at least two individual service providers in a common, analog RF communication frequency band;
   converter circuitry to convert the antenna signals associated with the beams between the common RF communication frequency band and a common digital IF band representing the signals of the at least two service providers;
   circuitry for duplicating the common digital IF band;
   digital filtering circuitry for processing the duplicated digital IF band and defining individual portions of the respective duplicated digital IF bands, such that a separate band portion is defined for signals of each of the at least two individual service providers;
   signal processing circuitry for each of the at least two service providers, the signal processing circuitry operable to process channel signals associated with the individual digital IF band portions defined for the individual service providers and to simultaneously drive the antenna to define at least one individual beam for each individual service provider, with at least one of the defined beams being steerable in at least one of azimuth and elevation.

2. The system of claim 1 wherein the converter circuitry includes frequency converter circuitry to convert the antenna signals between the frequencies of the common, analog RF communication frequency band and common intermediate frequencies for the band; and
   digital converter circuitry to convert the signals between the intermediate frequencies and a common digital IF band.

3. The system of claim 2 further comprising fiber converters coupled between the digital converter circuitry and the signal processing circuitry to optically pass the signals therebetween.

4. The system of claim 2 wherein the frequency converter circuit divides the communication frequency band into multiple bands for conversion and the digital converter circuit individually converts each of the multiple bands.

5. The system of claim 1 wherein the signal processing circuitry defines multiple individual beams for each individual service provider.

6. The system of claim 1 wherein the signal processing circuitry defines the individual beams by individually controlling each element of the array.

7. The system of claim 1 wherein the signal processing circuitry defines the individual beams simultaneously.

8. The system of claim 1 wherein individual beams are oriented in different directions.

9. The system of claim 1 wherein the converter circuitry divides the analog RF communication frequency band into multiple analog RF band portions for conversion.

10. The system of claim 1 wherein the antenna array of elements is operable to define multiple, individual beams for signals in a plurality of communication frequency bands.

11. The system of claim 10 further comprising a frequency multiplexor coupled between the antenna and the converter circuitry to provide transmit and receive signals for each of the plurality of communication frequency bands for individual conversion.

12. A cellular system for accommodating multiple service providers comprising:
a tower defining a plurality of sectors;
a plurality of sector antennas positioned proximate the top of the tower, each sector antenna oriented to face a sector and having an array of elements arranged in columns of multiple elements and operable to define multiple, individual beams in that sector by controlling elements of the columns, for handling signals of at least two individual service providers in a common, analog RF communication frequency band; converter circuitry to convert the antenna signals of the sector antennas between the common RF communication frequency band and a common digital IF band;
circuitry for duplicating the digital IF band;
digital filtering circuitry for processing the duplicated digital IF bands and defining individual portions of the respective duplicated digital IF bands for a sector, such that a separate band portion is defined for signals of each of the at least two individual service providers in the sector;
signal processing circuitry for each of the at least two service providers, the signal processing circuitry operable to process signals associated with the individual digital IF band portions defined for the individual service providers in the sectors and to simultaneously drive the antenna to define at least one individual beam in each sector for each individual service provider in that sector with at least one of the defined beams being steerable in at least one of azimuth and elevation.

13. The system of claim 12 wherein the signal processing circuitry is further operable to define multiple individual beams in each sector for each individual service provider in that sector.

14. The system of claim 12 wherein the signal processing circuitry is operable to define the individual beams in that sector by individually controlling each element of the array.

15. The system of claim 12 wherein said signal processing circuitry defines the individual beams simultaneously.

16. The system of claim 12 wherein individual beams are oriented in different directions.

17. The system of claim 12 wherein the antenna array of elements is operable to define multiple, individual beams in a sector for signals in a plurality of communication frequency bands.

18. A method for sharing a cellular tower among multiple service providers comprising:
generating at least one individual beam for a first service provider in a first band portion with an antenna having an array of elements arranged in columns of multiple elements and operable to define multiple, individual beams for signals in at least one analog RF communication frequency band through control of elements of the columns;
generating at least one other individual beam for a second service provider in a second band portion of the analog RE communication frequency band through control of the antenna elements;
converting the antenna signals associated with the beams between the RF communication frequency band and a digital IF band representing the signals of the first and second service providers;
digital filtering the digital IF band to define individual portions of the digital IF band such that a separate band portion is defined for the first and second service providers;
digital signal processing the signals associated with the separate digital IF band portions for the first and second service providers and driving the antenna to define individual beams of the first and second service provider; and
steering at least one of the defined beams in at least one of azimuth and elevation.

19. The method of claim 18 further comprising generating multiple individual beams for each individual service provider.

20. The method of claim 18 further comprising individually controlling each element of the array to generate the individual beams.

21. The method of claim 18 further comprising generating the individual beams simultaneously.

22. The method of claim 18 wherein the antenna is operable to define beams in multiple analog RF communication frequency bands and the method further comprises:
generating, for each of the analog RE communication frequency bands, an individual beam for each service provider in a corresponding band portion of the RF communication frequency band.

23. The method of claim 18 wherein said RF communication frequency band includes one of an RE link frequency band and a microwave backhaul frequency band.

24. A cellular tower shared among multiple service providers comprising:
an antenna positioned proximate the top of the tower and having an array of elements arranged in columns of multiple elements and operable to define multiple, individual beams for signals of at least two individual service providers in an analog RF communication frequency band by controlling elements of the columns;
converter circuitry to define a digital IF band from the analog RF communication frequency band;
signal processing circuitry for each of the at least two service providers, the signal processing circuitry operable to process the digital IF band and define individual digital IF band portions corresponding to the service providers and to process signals of the service providers associated with such digital IF band portions and simultaneously drive the antenna to define at least one individual beam for each individual service provider wherein at least one defined beam is steerable in at least one of azimuth and elevation.

* * * * *